FIG. 2

INVENTOR.
S. MORGAN BARBER
ERNEST NEWELL MARTIN
BY
ATTORNEYS

FIG. 3

INVENTOR.
S. MORGAN BARBER
ERNEST NEWELL MARTIN
BY
ATTORNEYS

Jan. 10, 1961    S. M. BARBER ET AL    2,967,644
DISPENSING MACHINE
Filed Feb. 28, 1956    7 Sheets-Sheet 4

INVENTOR.
S. MORGAN BARBER
ERNEST NEWELL MARTIN
BY
ATTORNEYS

Jan. 10, 1961  S. M. BARBER ET AL  2,967,644
DISPENSING MACHINE
Filed Feb. 28, 1956  7 Sheets-Sheet 7

Fig. 19

INVENTOR.
S. MORGAN BARBER
ERNEST NEWELL MARTIN
BY
Lehr & Swain
ATTORNEYS

United States Patent Office 2,967,644
Patented Jan. 10, 1961

2,967,644

DISPENSING MACHINE

S. Morgan Barber, San Marcos, and Ernest N. Martin, Escondido, Calif., assignors, by mesne assignments, to Universal Metal Products Corporation, a corporation of Missouri Filed Feb. 28, 1956, Ser. No. 568,319

19 Claims. (Cl. 222—144)

This invention relates generally to a dispensing machine and more particularly to an automatic dispensing machine of the type which can be selectively operated to dispense any one of a plurality of commodities.

In general, it is an object of the present invention to provide an improved automatic dispensing machine which can be selectively operated to dispense any one of a plurality of commodities.

Another object of the invention is to provide a dispensing machine of the above character having a commodity wheel upon which improved commodity canisters are circumferentially disposed.

Another object of the invention is to provide a dispensing machine of the above character in which the canisters are shaped to utilize the largest practical area of the commodity wheel.

Another object of the invention is to provide a dispensing machine of the above character in which the canisters are also shaped so that substantially all of the commodities can be dispensed without rotation of the commodity wheel.

Another object of the invention is to provide a dispensing machine of the above character in which the capacity of the canisters can be increased without increasing the size of the dispensing machine.

Another object of the invention is to provide a dispensing machine of the above character in which individual means is provided in each commodity canister for readily adjusting the quantity of the commodity dispensed.

Another object of the invention is to provide a dispensing machine of the above character in which the commodity canisters are provided with visual means so that the quantity of commodity within the canister can be readily ascertained.

Another object of the invention is to provide a dispensing machine of the above character having a cup well and in which means is provided for withdrawing steam from the cup well.

Another object of the invention is to provide a dispensing machine of the above character in which means is provided on the cup well for preventing a powdered commodity from being sucked from the cup well.

Another object of the invention is to provide a dispensing machine of the above character having dispensing means in which means are provided for causing circulation of the material to prevent bridging.

Another object of the invention is to provide a dispensing machine of the above character in which improved means is provided for supplying an even flow of hot water.

Another object of the invention is to provide a dispensing machine of the above character in which improved means is provided for collecting waste water.

Further objects and features of the invention will appear from the following description in which the preferred embodiment has been set forth in detail in conjunction with the accompanying drawings.

Referring to the drawings.

The dispensing machine shown in the drawing consists of a housing or cabinet 11 having side walls 12 and 13, top and bottom walls 14 and 16, a rear wall 17 and a hinged front door 18. The door 18 is adapted to be opened by a lock 19.

A commodity wheel 21 is mounted in the cabinet, as for example, on the rear side of the door 18 and consists of a shaft 22 which is journalled in a bearing 23 carried by a supporting member 24. The supporting member 24 is fixed to a plate 26 which is mounted upon the rear side of the front door 18. One end of the shaft 22 extends through the front side of the door and is fixed to a hub 27. A dial 28 is mounted on the shaft 22 adjacent hub 27 and is provided with indicators 29 which have printed upon them the names of the commodities contained in the canisters 32 mounted on the commodity wheel. A handle 33 is mounted on the hub 27 for rotating the shaft 22. A flat disc or wheel member 34 is mounted on the other end of the shaft 22 by suitable means such as a hub 36 which is fixed to the disc 34 and fastened to the shaft 22 by a set screw 37. A ratchet wheel 38 is fixed on shaft 22 and is adapted to be engaged by a pawl 39 movably mounted on supporting member 24 by a screw 41. A spring 42 serves to urge pawl 39 into continuous engagement with the ratchet wheel. Thus, the pawl prevents the commodity wheel from being rotated in a clockwise direction as viewed in Figure 3.

A plurality of the commodity canisters are spaced circumferentially about the shaft 22 and are detachably mounted on wheel member 34. Each of the commodity canisters is in the form of an irregularly shaped polygon and has five side walls 48, 49, 51, 52 and 53 and rear and front walls 54 and 56.

Figure 3:
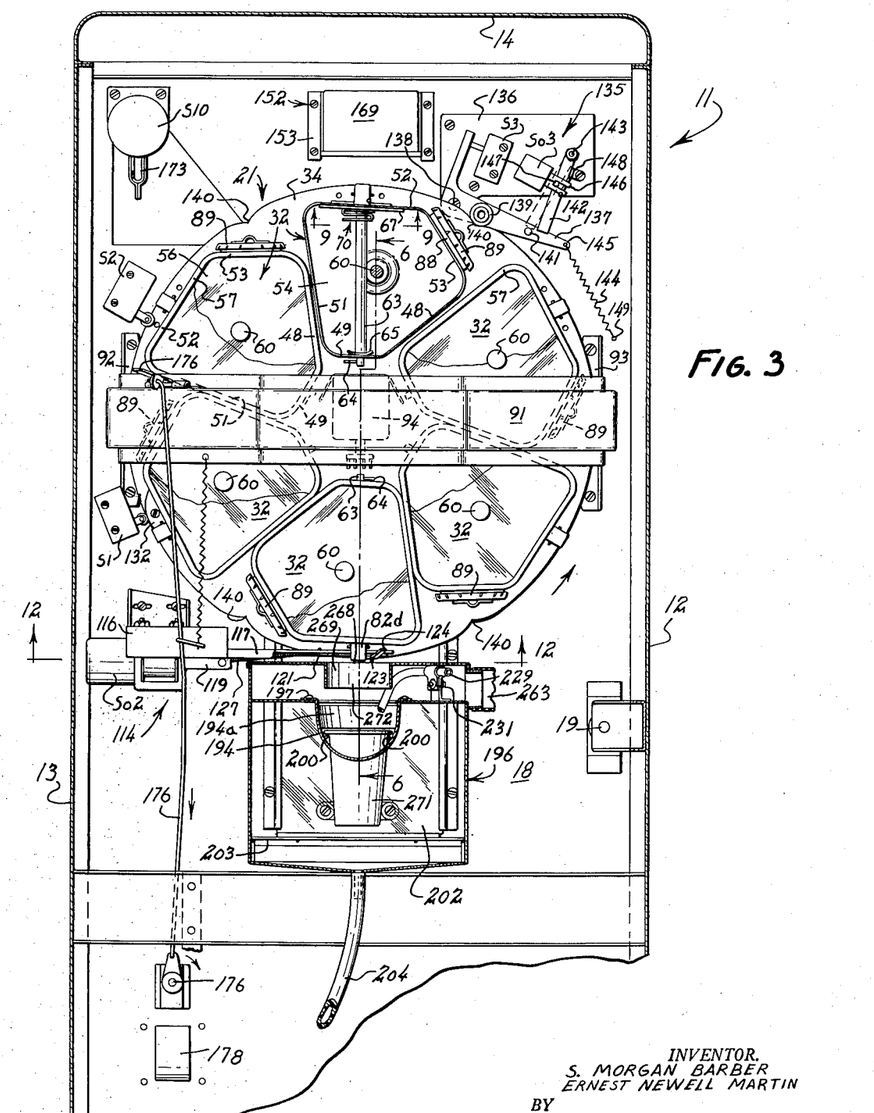
Figure 3 is a cross sectional view taken along the line 3—3 of Figure 2 and in particular shows the commodity wheel.
Figure 4:
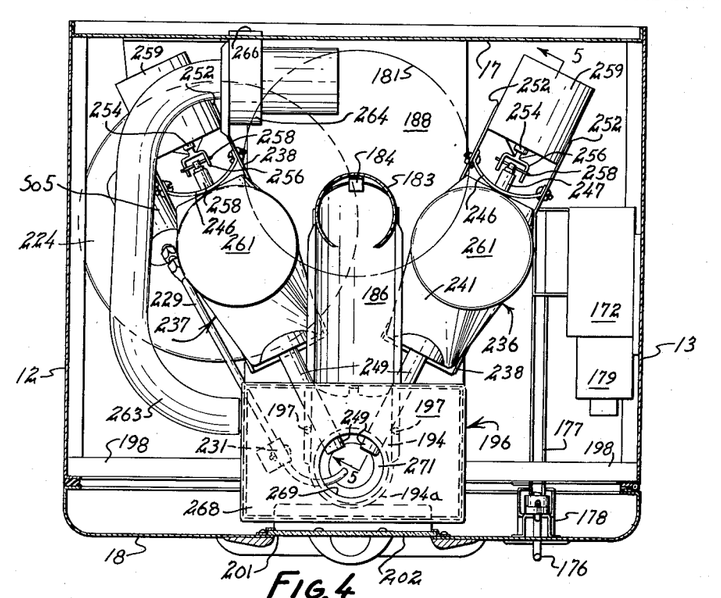
Figure 4 is a cross sectional view taken along the line 4—4 of Figure 2 and in particular shows the cream and sugar dispensing means.

The canister shape is such that it will make possible maximum utilization of the total area of disc or wheel member 34. As can be seen in Figure 3 the six canisters cover substantially all of the exposed surface of the wheel member. Thus, we have found it desirable to form each canister in such a manner that wall 48 forms an angle of 140 degrees with wall 49, wall 49 an angle of 101 degrees with wall 51, wall 51 an angle of 79 degrees with wall 52, wall 52 an angle of 125 degrees with wall 53 and wall 53 an angle of 97 degrees with wall 48. It is particularly important that side wall member 51 forms an angle of approximately 90 degrees with wall 52 for a purpose hereinafter described.

Figure 10:
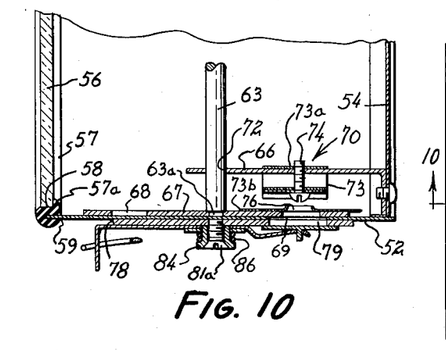
Figure 10 is a cross sectional view taken along the line 10—10 of Figure 9.

The side and front walls of the canister are formed of a suitable material such as metal whereas the rear wall is formed of a suitable transparent material such as plastic. The transparent rear wall 56 is removably attached to the side walls of the canister by a resilient retaining member 57 of suitable material such as rubber. The retaining member 57 has a lip portion 57a (Figure 10) which provides a groove 58 which accommodates the rear wall 56. A slot 59 in the resilient member 57 accommodates the side walls of the canister.

The commodity canisters 32 are secured to the wheel member 34 by suitable means such as a bolt 60 which extends through a cylindrical spacing member 61 mounted between the front and rear walls 54 and 56 and threaded into the wheel member 34. A keeper 62 mounted in the bolt 60 prevents the bolt from slipping out of the canister when the canister is removed from the disc.

Figure 9:
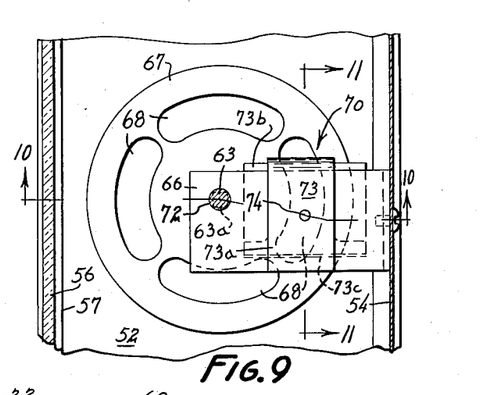
Figure 9 is a cross sectional view taken along the line 9—9 of Figure 3 and in particular shows the dispensing wheel.

The canisters 32 are particularly suited for powdered materials such as powdered coffee, cocoa, soups and the like. Means is provided in each of the canisters for measuring out a predetermined quantity of material and consists of a drive shaft 63 mounted within the commodity canister. One end of the shaft protrudes from the side wall 49 of the canister and a drive pin 64 is fixed thereto at right angles to the drive shaft for a purpose hereinafter described. A keeper 65 mounted in the shaft 63 adjacent wall 49 serves to retain the shaft in the canister. The lower end of the shaft 63 as viewed in Figure 6 in the bottom canister is journalled in a bracket 66 mounted on the front wall 54. A measuring disc 67 is mounted on the squared lower end 63a of shaft 63 in a plane parallel to and adjacent to side wall 52. As shown in Figure 9 the measuring disc 67 is provided with a plurality of arcuate slots 68 of equal size spaced circumferentially from the shaft 63. The arcuate slots serve to carry material over an opening 69 in the side wall 52 as hereinafter described.

Figure 11:
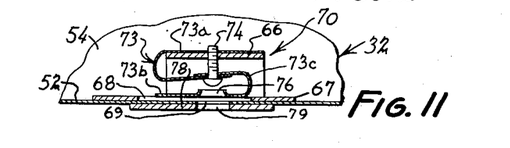
Figure 11 is a cross sectional view taken along the line 11—11 of Figure 9.

Suitable adjustment means 70 is mounted within each canister for varying the quantity of material moved over the opening 69 by the measuring disc 67 and includes the bracket 66 which extends over and is spaced from the opening 69. The drive shaft 63 passes through a hole 72 in the support bracket 66. An S-shaped measuring member 73 is mounted between the support bracket 66 and the measuring disc 67. The top portion 73a of the S-shaped member is fixed to the bracket 66. The lower portion 73b of the member 73 overlies the opening 69 and is adapted to be spaced from the dispensing wheel 67 by a screw 74 which extends through the intermediate portion 73a of the member 73 and is threaded into the bracket 66. The portion 73b is provided with an opening 76 (Figure 11) so that a screwdriver or similar device may be inserted through the opening 69 and 76 to adjust the screw 74 to vary the spacing between the portion 73b and the dispensing wheel 67. Thus, the quantity of material moved over the opening 69 can be adjusted by the screw 74.

Figure 7:
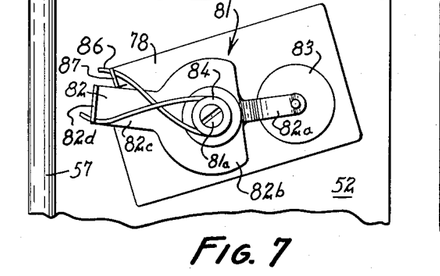
Figure 7 is an enlarged view of one of the flap valves mounted on each of the commodity canisters and shows the valve in a closed position.
Figure 8:
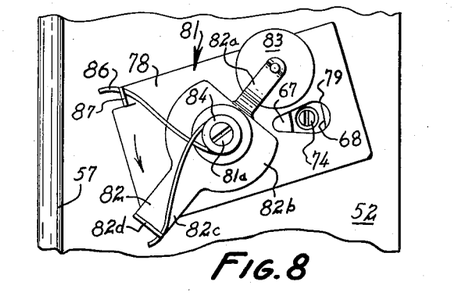
Figure 8 is a view similar to Figure 7 but shows the valve in an open position.

A reinforcing plate 78 is mounted on the outer side of the side wall 52 and is provided with an oval-shaped opening 79 which underlies the opening 69 in the side wall 52. A flap valve 81 is rotatably mounted on a screw 81a threaded into plate 78. The flap valve consists of an operating member 82 and a circular flap 83. The operating member 82 is comprised of an elongate portion 82a upon which the circular flap 83 is rotatably mounted, a circular portion 82b and another elongate portion 82c. A flanged collar 84 is mounted on the screw 81a and serves to retain the operating member 82 in position. A spring 86 is mounted on the collar and has one end engaging the depending portion 82d of the operating member and the other end engaging a projection 87 on the reinforcing plate 78. As can be seen from Figure 7, the spring 86 normally maintains the flap valve 81 in a closed position by urging the portion 82c into engagement with the projection 87. In this position, the circular flap 83 closes the opening 79 and prevents the discharge of material from the canister. The side 53 of each of the canisters is provided with an opening 88 through which the canister can be filled with a desired commodity or ingredient. A removable cap 89 normally closes the opening.

It will be noted that adjacent sides 52 and 53 are used for filling and dispensing in each canister and that these two sides are adjacent the outer margin of the wheel member. Side 52 faces downwardly in the 6 o'clock position of the canister and side 53 faces upwardly in the 11 o'clock position. Thus, the commodity is normally dispensed in the 6 o'clock position and the canister is normally filled in the 11 o'clock position.

Figures 6, 18:
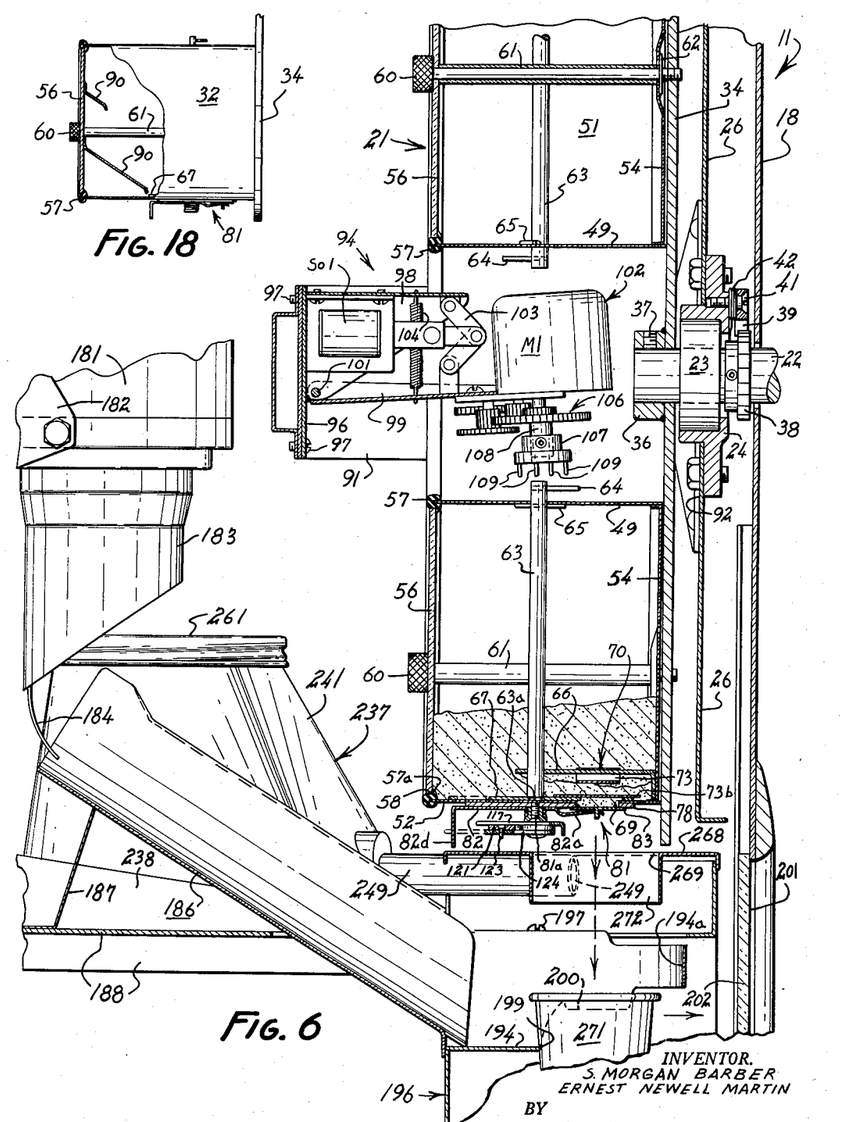
Figure 6 is an enlarged cross sectional view taken along the line 6—6 of Figure 3 and shows in particular the means for dispensing commodities from the commodity canisters.
Figure 18 is a reduced view partly in cross section of a modified canister.

The capacity of each canister can be increased by increasing the width of the side walls as shown in Figure 18. Baffles 90 are mounted on one of the canister walls such as the front wall 56 and urge the commodity within the canister towards the measuring disc 67 as the canister is rotated. Thus, the capacity of the canisters can be increased without increasing the diameter of the wheel member 34 and the size of the whole machine. This is particularly important because the diameter of the wheel member is the controlling dimension for the width of the machine.

A bridge-like member or mounting bracket 91 extends diametrically across the side of the commodity wheel 21 and has its ends fixed to the rear side of the front door 18 at 92 and 93. A drop motor assembly 94 is carried by the mounting bracket 91 intermediate the ends thereof and consists of a plate 96 which is fixed to the bracket 91 by screws 97. A U-shaped bracket 98 is fixed to plate 96 and carries a solenoid SO1. A plate-like member 99 is hinged at 101 to bracket 98 and carries a gear motor assembly 102. The free end of the plate-like member 99 is adapted to be moved upwardly and downwardly relative to the U-shaped bracket 98 by a toggle joint 103 connected between bracket 98 and member 99 and actuated by the solenoid SO1. A spring 104 having one end fastened to the bracket 98 and having the other end fastened to the plate-like member 99 continuously pulls the plate-like member 99 upwardly with respect to the bracket 97. Thus, when the solenoid SO1 is not energized, the gear motor assembly 102 will be held in the position shown in Figure 6. It is apparent that when the solenoid is energized, the solenoid will operate the toggle joint 103 to move the gear motor assembly 102 downwardly towards the canister below it.

The gear motor assembly 102 consists of a motor M1 and associated gearing 106. A flanged driving member 107 is mounted on the output shaft 108 of the gearing 106 and is provided with a plurality of depending pins 109 which are adapted to engage the drive pin 64 in the shaft 63 when the gear motor assembly 102 is lowered by the solenoid SO1. Thus, when the motor M1 and the solenoid SO1 are energized, the measuring disc 67 will be rotated through an arc so that one of the arcuate slots 68 is moved over the opening 69 to measure out the desired quantity of material.

Figure 12:
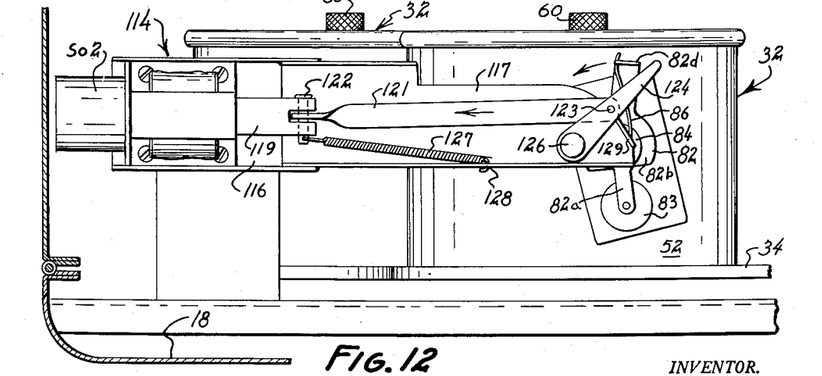
Figure 12 is a cross sectional view taken along the line 12—12 of Figure 3 and shows the means for operating the flap valves on the commodity canisters.
Figure 13:
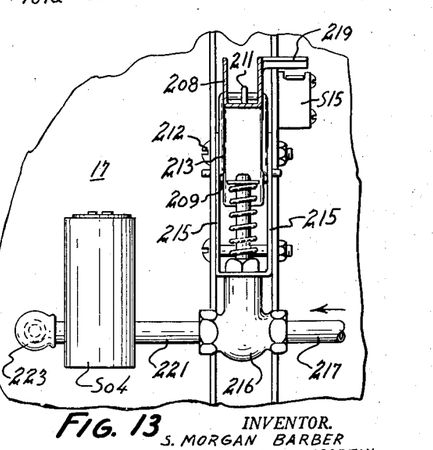
Figure 13 is a cross sectional view taken along the line 13—13 of Figure 2.

Valve operating means 114 is also mounted on the front door 18 in a horizontal plane below the commodity wheel 21. It consists of a U-shaped member 116 fastened to the rear side of the front door 18. A flat plate-like member 117 is fixed to the U-shaped member 116 and extends into the region immediately below the center of the commodity wheel 21. A solenoid SO2 is mounted on the U-shaped member 116 and its plunger 119 is connected to one end of a lever 121 by pin 122. The other end of the lever is pivotally connected at 123 intermediate the ends of an arm 124. The arm 124 has one end pivotally connected to the plate-like member 117 at 126 and the other end of the arm is adapted to engage portion 82d of the operating member 82. A tension spring 127 has one end connected to the pin 122 and has its other end connected to the plate-like member 117 at 128 to continuously urge the arm 124 in a clockwise direction as viewed in Figure 12. An abutment 129 on the plate-like member 117 serves to limit the clockwise movement of the arm 124. It is apparent that when solenoid SO2 is energized the arm 124 will be moved in a counterclockwise direction as viewed in Figure 12 to engage portion 82d of the operating member 82 to move the flap valve 81 to an open position. When the solenoid SO2 is deenergized, the arm 124 is moved to an out-of-the-way position by spring 127. The arm in this position permits rotation of the commodity wheel.

Operation of the commodity wheel 21 may now be briefly described as follows:

The commodity wheel 21 is normally rotated in a counterclockwise direction as viewed in Figure 3 by handle 33 until the desired commodity has been selected. The canister 32 containing the desired commodity will be in the 6 o'clock position as viewed in Figure 3. In this position the canister is adapted to be engaged by the drop motor assembly 94 and the valve operating means 114.

The valve operating means 114 is operated at the same time the drop motor assembly 94 is operated. Flap 83 is maintained in an open position during the time the measuring disc 67 is rotated through a predetermined arc so the measured quantity of commodity will be dispensed from the canister through opening 69.

At the same time the measuring disc 67 is rotated, the shaft 63 used for rotating the disc serves to agitate the commodity within the canister to prevent bridging and caking so that the commodity can be readily dispensed. Thus, measured quantities of the commodity may be dispensed from the same canister without rotating the commodity wheel.

As hereinbefore described, side wall 51 forms an angle of approximately 90 degrees with the side wall 52 in which the dispensing opening 69 is provided. Since the commodity wheel can be rotated in only one direction, it is apparent that side wall 51 always leads side wall 52. This is important because as the quantity of a commodity within a canister decreases, and as the commodity wheel is rotated, the remaining commodity or material will fall into the corner formed by side walls 51 and 52. When the canister reaches the 6 o'clock position the substantially vertical side wall 51 has urged the remaining commodity within the canister over the adjacent arcuate slot 68 in the measuring disc 67. Thus, substantially all of the commodity may be dispensed from any canister without intermediate rotation of the commodity wheel.

In the increased capacity canister shown in Figure 18 the baffles 90 also serve to move the remaining commodity within the canister toward the arcuate slots 68 in the measuring disc and thus even in the larger canister substantially all of the commodity within the canister can be dispensed without intermediate rotation of the commodity wheel.

Certain of the commodity canisters 32 are provided with cam members 132 (Figure 3) fixed to the disc 43 which are adapted to engage microswitches S1 and S2 mounted on the rear side of the front door 18 for purposes hereinafter described.

We have also provided commodity wheel position locking means 135 mounted on the rear side of the front door 18 in approximately the 1 o'clock position of the commodity wheel 21 as viewed in Figure 3. It consists of an L-shaped member 137 which is pivotally connected to the rear side of the door 18 at 138. A roller 139 is mounted on one of the arms of the L-shaped member 137 and is adapted to engage a plurality of indentations 140 in the outer periphery of the disc 34, the indentations being spaced circumferentially about the disc and the number of indentations being equal to the number of commodity canisters 32 mounted on the disc. A pin 141 is also mounted on the arm of the L-shaped member containing the roller 138 and is adapted to be engaged by one end of a lever 142. The other end of the lever 142 is pivotally connected to the plate 136 at 143. A spring 144 having one end fastened at 145 to the member 137 and the other end fastened to the rear side of the door 18 at 149 serves to continuously urge the L-shaped member 137 in a clockwise direction about a pivot 138 as viewed in Figure 3.

The lever 142 is adapted to be moved into engagement with the pin 141 by solenoid SO3 which has its plunger 146 engaging a pin 147 mounted on the lever 142 intermediate its ends. A stop 148 mounted on the plate 136 serves to limit the counterclockwise movement of lever 142 as viewed in Figure 3.

The other arm of the L-shaped member 137 is adapted to engage a microswitch S3 mounted on the plate 136 to prevent operation of the dispensing machine when the roller 139 is not in engagement with an indentation 140.

A suitable timing assembly 152 for the dispensing machine has also been mounted on the rear side of the front door 18 and consists of a cradle 153 which is mounted on the door. Motor M2 is mounted on the cradle 153 and is connected to a gear train 156 which drives an output shaft 157. Another shaft 158 is journalled in the cradle 153 and is connected to shaft 157 by lost motion means 159. The lost motion means consists of a cam member 160 mounted on shaft 157 and a moon-shaped member 161 mounted on shaft 158. A pin 162 is mounted on the outer end of member 160 and is adapted to engage either one of the outer extremities of the moon-shaped member 161. It is thus apparent that a certain limited movement is permitted between shaft 157 and 158. A plurality of cams 163, 164, 166, 167 and 168 are mounted on the shaft 158 and are adapted to operate microswitches S4, S5, S6, S7 and S8 respectively which are mounted on the cradle 153. Cams 163, 164, 166 and 167 are each comprised of two segments a and b which are adapted to be rotated with respect to each other on the shaft 158 to increase or decrease the arc subtended by the cam device to vary the period of engagement with the associated switch. The cams are positioned circumferentially about shaft 158 to operate the switches S4 to S8 in a predetermined sequence as hereinafter set forth. A cover 169 serves to close the entire timing assembly 152. A switch 59 is mounted on the bottom of the cradle 153 for a purpose hereinafter described.

In the upper left-hand corner of the rear side of the front door 18 as viewed in Figure 3, we have provided a selector switch S10 which is adapted to be operated by a knob 171.

Suitable coin accepting means is mounted within the cabinet and consists of a coin changer 172 which is mounted on side wall 13 and is connected to coin slot 173 by an extensible coin passageway 174. The coin changer may be of any suitable type such as Model A-5401 manufactured by National Rejectors, Inc. of St. Louis, Missouri. As is well known to those skilled in the art such a coin changer may include a vending switch S11 which is adapted to be operated by a coin passing into the coin changer, a magnet 175 which is to be energized by the coin when change is required, and a tube switch S12 which is energized when the change tube of the coin changer has less than a predetermined number of nickels. A rejected coin lever 176 is connected to the coin changer. The rejected coins pass through a chute 177 into a receptacle 178. A coin box 179 is connected to the lower portion of the coin changer and collects the coins accepted by it.

A cup dispenser 181 is mounted on the rear wall 16 in the upper portion of the cabinet by brackets 182. The cup dispenser may also be of any suitable type such as model EX 1295 manufactured by National Rejectors, Inc. of St. Louis, Missouri. As is well known to those skilled in the art, a cup dispenser of this type may include a motor M3 for operating the cup ejecting mechanism. It may also include switches S13 and S14 for purposes hereinafter described. Switch 14 is adapted to be closed when the supply of cups in the cup dispenser has been depleted.

The cup dispenser 181 includes a chute 183 through which the cups are discharged. The cups strike a curved member 184 fixed to the chute 183 which deflects the bottom end of the cups forwardly as viewed in Figure 6 so that the cups drop sidewise onto an inclined trough 186. The upper end of the trough is supported by a bracket 187 fixed to framework 188. The lower end of the trough 186 feeds into a horizontal trough extension 194 which is fixed to a cup well 196 by screws 197. The cup well 196 is fixed to framework members 198 which are fastened to the side walls of the cabinet. The trough extension 194 is provided with an opening 199 in its bottom wall, a rounded end portion 194a and a pair of flanges 200. Thus as the cup drops bottom end first through the opening 198, the rim of the cup will be engaged by the flanges 200. The end portion 194a prevents the cup from overshooting the opening 199. It will be noted that the lower side of the end portion 194a is slightly above the upper edge of the cup so that it may be readily removed.

The upper forward portion of the cup well 196 is open and communicates with an opening 201 in the front door which is normally closed by a sliding door 202 of a suitable material such as plastic. Thus the cups may be removed from the container by lifting the door 202.

Figure 1:
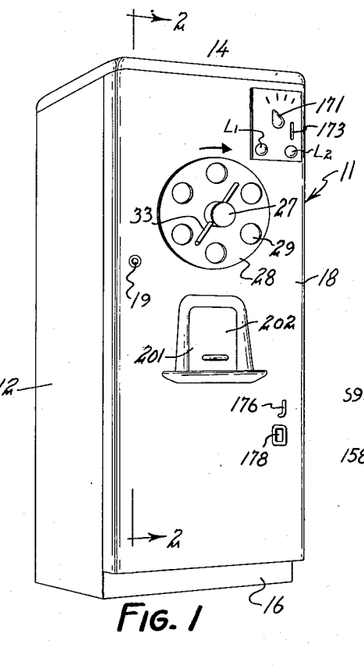
Figure 1 is an isometric view of a dispensing machine incorporating the features of the present invention.
Figure 2:
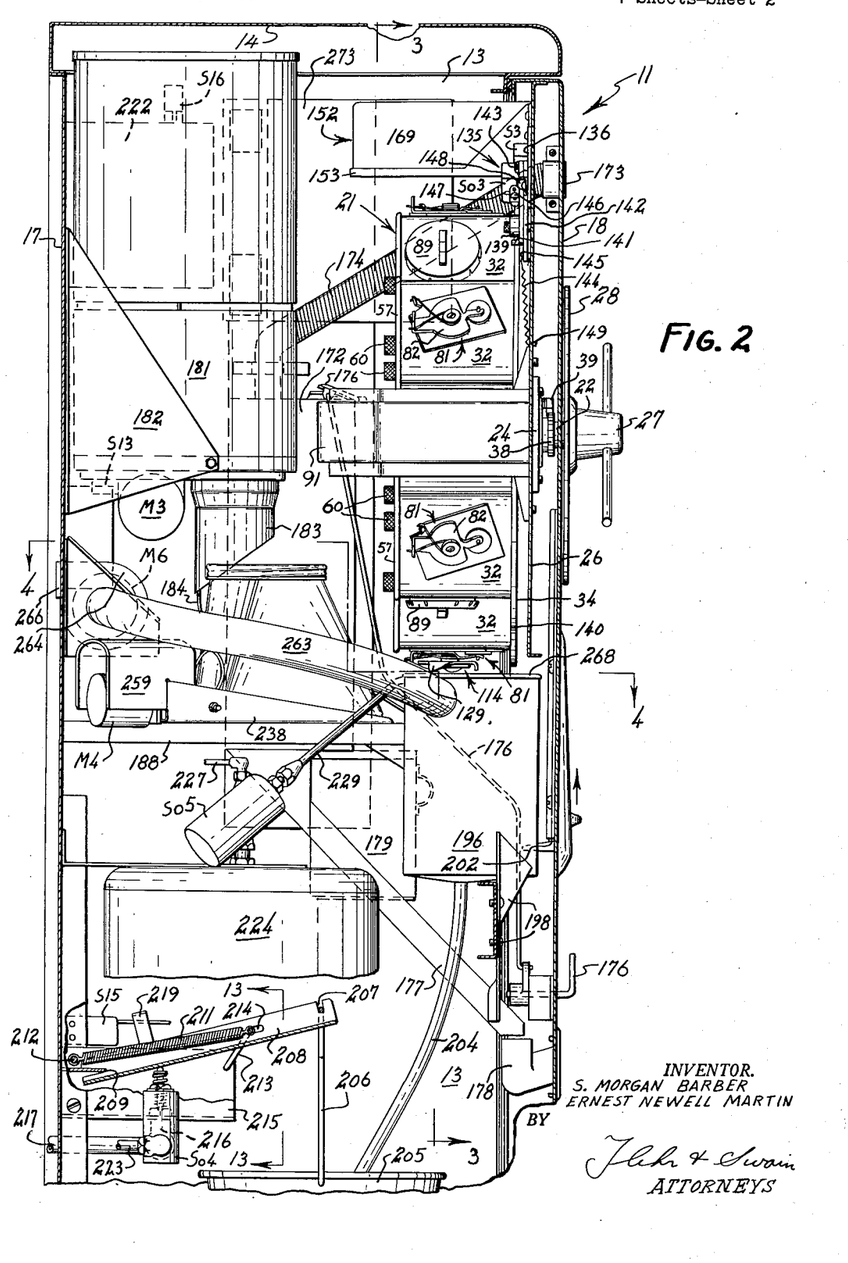
Figure 2 is an enlarged cross sectional view taken along the line 2—2 of Figure 1.

A screen 203 is mounted in the lower portion of the cup well 196. The bottom of the cup well 196 is connected to a tube 204 which feeds into a waste bucket 205. The handle 206 of the waste bucket is carried in notches 207 in one end of a U-shaped lever 208. The other end of the lever 208 is pivotally connected to the rear wall of the cabinet at 209. A spring 211 has one end fixed to the rear wall of the cabinet at 212 and has the other end engaging a U-shaped member 213 to continuously urge the lever 208 in a counterclockwise direction as viewed in Figure 2. The upper end of the U-shaped member 213 is slidably mounted in slots 214 in the lever 208 and the lower ends of the U-shaped member 213 are pivotally mounted in plates 215 fixed to the rear wall of the housing. Thus the U-shaped member 213 serves to limit the upward movement of the lever 208 and in conjunction with spring 211 provides a snap action when the lever 208 is moved downwardly past center.

The lever 208 is adapted to engage a manually operated valve 216 mounted in the water supply inlet piping 217. The switch 216 is normally in an open position and is moved to a closed position when the lever 208 is moved downwardly by the waste bucket 205. The tension on the spring 211 is set so that the lever 208 will snap the valve 216 into a closed position when the waste bucket 205 is nearly full to prevent the flow of additional water through piping 217.

At the same time valve 208 is closed, a switch S15 mounted on one of the plates 215 is operated by an extension 219 mounted on the lever 208. When switch S15 is operated by the weight of the waste bucket, the power supply to the machine is cut off. Thus when the water in the waste bucket reaches a certain level it will cut off the water supply and power to prevent overflow of the bucket.

Figures 14, 16:
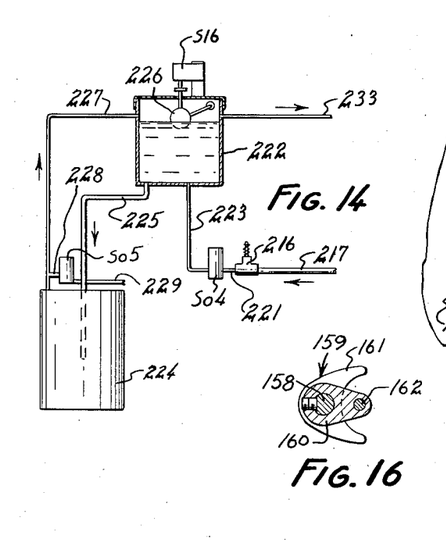
Figure 14 is a view, partially schematic, illustrating the water system utilized.
Figure 16 is a cross sectional view taken along the line 16—16 of Figure 15.
Figure 15:
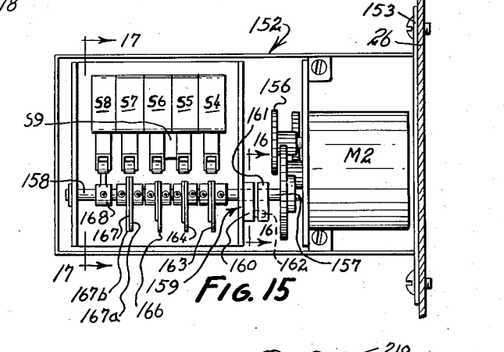
Figure 15 is a plan view of the timing means with the cover removed.
Figure 17:
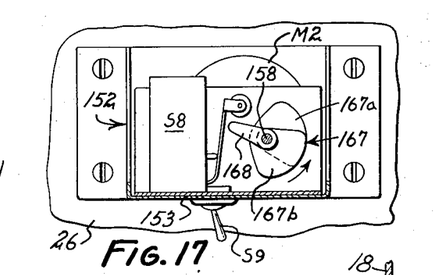
Figure 17 is a cross sectional view taken along the line 17—17 of Figure 5.
Figure 19:
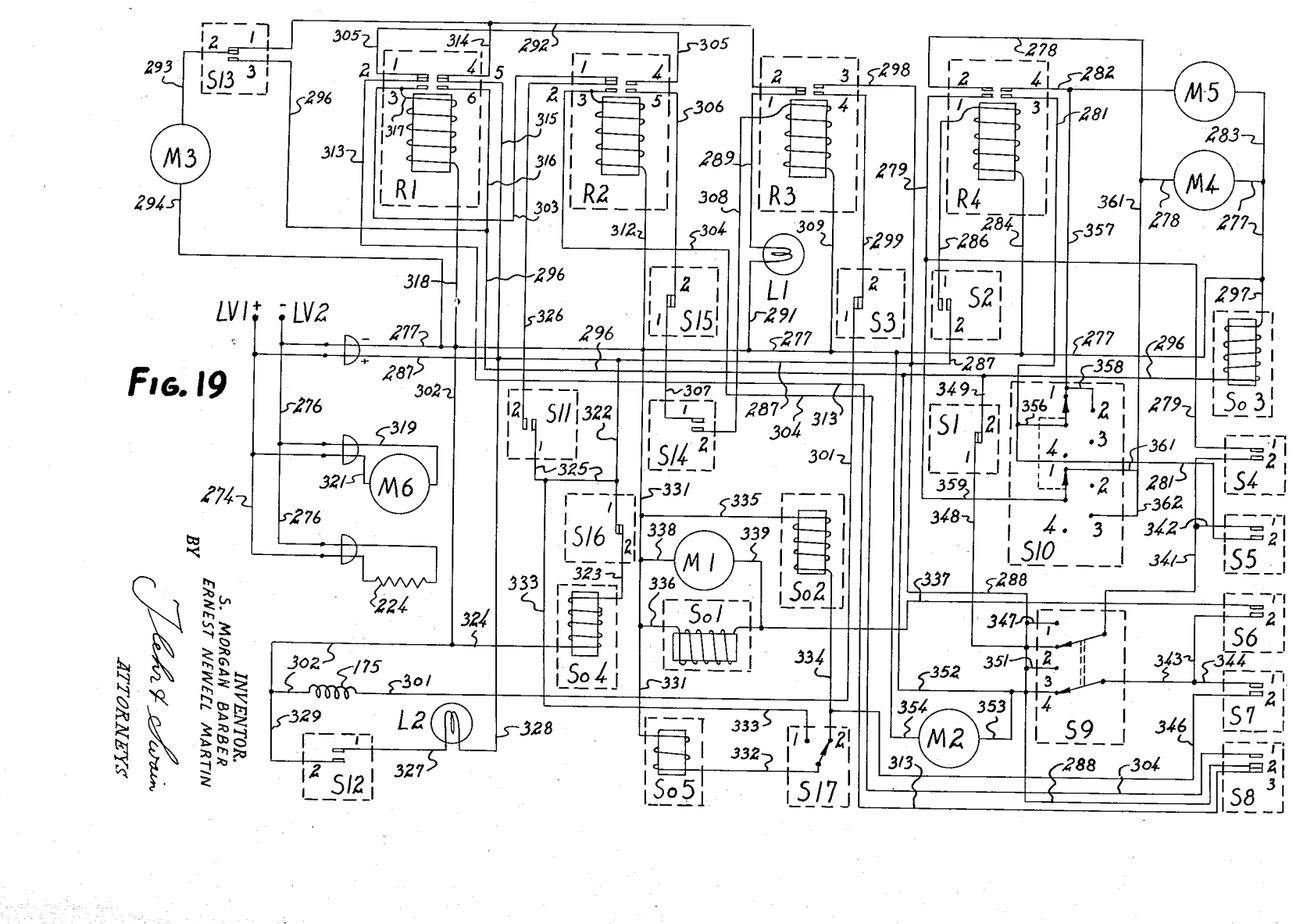
Figure 19 is a circuit diagram serving to illustrate mechanical and electrical features of the present invention.

Valve 216 is connected by piping 221 to a solenoid operated valve SO4 and the solenoid operated valve SO4 is connected to the lower end of a water reservoir 222 by piping 223. The water reservoir is mounted in the upper portion of the housing adjacent the rear wall 16 and the side wall 13. The reservoir is also connected to a hot water tank 224 by piping 225 (Figure 14). The hot water tank is mounted in the lower portion of the housing upon a suitable framework (not shown). A switch S16 is mounted on top of the water reservoir 222 and is adapted to be operated by a float 226 mounted within the reservoir. Switch S16 controls the operation of solenoid operated valve SO4. The upper portion of the reservoir 222 is also connected to the top of the hot water tank 223 by piping 227. One side of the solenoid operated valve SO5 is connected to piping 227 by piping 228 and the other side of the valve SO5 is connected to piping 229. The piping 229 is fastened to the cup well 196 by clamp 231 and its extreme end is bent downwardly and is adapted to feed a stream of water into a cup carried with the cup well 196. The upper end of the reservoir 222 is also connected to piping 233 which empties into the waste bucket 205. Solenoid valve SO5 is adapted to be operated manually or automatically through a switch S17 (Figure 19).

Figure 5:
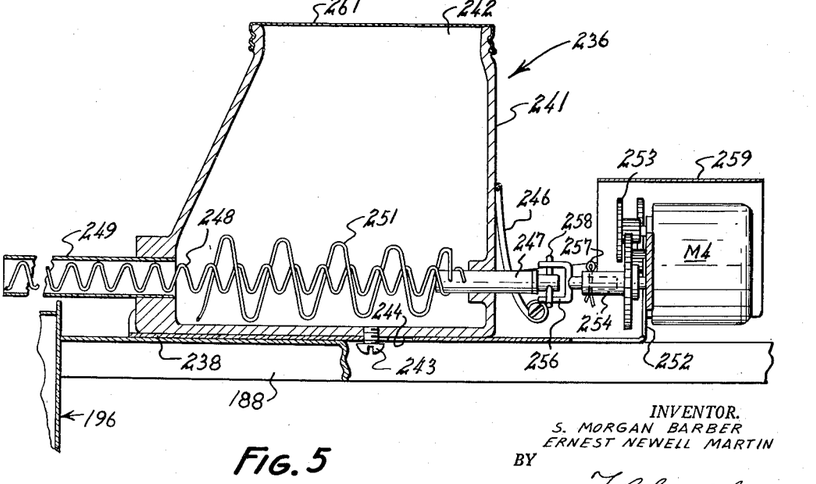
Figure 5 is a cross sectional view taken along the line 5—5 of Figure 4 and shows the cream dispensing means.

A pair of dispensing devices 236 and 237 are mounted within the cabinet upon U-shaped frameworks 238. Dispensing device 236 consists of a shoe-shaped receptacle 241 having a top opening 242. The receptacle 241 is detachably mounted on the framework 238 by a screw 243 which is threaded into the bottom of the receptacle 241 and is adapted to engage a key hole-like slot 244 in the framework 238. A hoop spring 246 has its ends pivotally mounted on the framework 238 and continuously urges the receptacle to the left as viewed in Figure 5 and urges the screw 243 into the narrower portion of the slot 244. Thus merely by shoving the receptacle 241 rearwardly or to the right as viewed in Figure 5, the receptacle may be lifted away from the framework 238 and out of the cabinet.

A shaft 247 is journalled in one side wall of the receptacle 241 and has one end connected to a small helical spring 248 which extends through the receptacle 241 and into a spout 249 mounted in the opposite side wall of the housing. When the receptacle 241 is in place, the spout 249 extends into an area overlying the cup well 196 in such a manner that when a product is discharged from the spout 249 it will drop into a cup held by the cup well 196. If the receptacle 241 is utilized for dispensing material that has a tendency to cake or bridge, an additional helical spring 251 of a larger diameter is used and is mounted on the shaft 247 coaxial with spring 248. It has been found that as springs 248 and 251 are rotated, spring 251 causes what might be termed a pumping action to push the contents of the receptacle forwardly and upwardly so that the contents are continuously recirculated to prevent bridging within the canister.

Suitable means is utilized for rotating the shaft 247 and consists of a motor M4 which is fixed to a bracket 252 which is a part of the framework 238. The motor M4 is connected to a gear train 253 which has an output shaft 254 which is connected to a yoke-like member 256 by a cotter pin 257. The yoke-like member 256 is adapted to engage a pin 258 mounted on shaft 247. A U-shaped covering 259 is fixed to the framework 238 and serves to protect the motor M4 and the gear train 253. A suitable cap or cover 61 is screwed on the top of the receptacle 241 and closes the opening 242.

The dispensing device 237 is substantially identical to dispensing device 236 except that the large helical spring 251 is omitted because sugar which is normally dispensed from device 237 does not cake as readily as powdered cream or milk which is normally carried in dispensing device 236. The motor for dispensing device 237 will be denoted as M5. It is apparent from the positioning of dispensing devices 236 and 237 in the cabinet that both devices may dispense ingredients simultaneously into a cup held within the cup well 196.

It has been found that when hot water is dispensed into a cup within the cup well 196 through piping 229 that steam is given off which rises into the canister from which the commodity is being dispensed. This is undesirable because the stem causes caking of the commodity within the canister. Thus, suitable means has been provided for withdrawing the steam from the cup well 196 and consists of a hose 263 which has one end opening into the upper portion of cup well 196. The other end of the hose is connected to a continuously operated blower 264 having a discharge outlet 266 extending through the rear wall of the cabinet. The blower 264 is driven by a motor M6 and creates a vacuum which serves to withdraw the steam from the cup well and discharge it outside the cabinet.

A lid 268 fits over the top of the cup well 196 and is provided with an opening 269 which generally underlies the commodity wheel and permits the commodity dispensed from the selected canister to fall into the cup 271. A collar 272 is mounted on the lid 268 and is aligned with the opening 269. The collar serves to protect the powdered commodity when it drops through the opening 269 so that it will not be drawn out of the cup well by the blower 264. The spouts 249 of the cream and sugar dispensing devices 236 and 237 extend through collar 272 so that the collar also protects the cream and sugar from the vacuum created by blower 264. Thus the collar 272 serves to protect the powdered commodities as they drop into the cup 271.

A control box 273 is mounted on the side wall 13 of the cabinet and contains relays R1, R2, R3 and R4 (not shown). Box 273 also carries the toggle switch S17 (not shown). A pair of lamps L1 and L2 are mounted on the front door for a purpose hereinafter described.

Figure 19 is a circuit diagram for our dispensing machine. The contacts on the relays R1–R4 have been numbered and the contacts of the switches S1–S17 have also been given numbers. Switch S10 is comprised of two banks which have been denoted as bank 1 and bank 2, each bank having four contacts.

Lines LV1 and LV2 are connected to a suitable source of power such as 110 volt 60 cycle A.C. Line LV1 is connected to one side of the hot water heater 224 by a conductor 274 and the other side of the hot water heater is connected to line LV2 by conductor 276. Conductor 276 is connected to one side of motor M4 by conductor 277 and the other side of the motor M4 is connected to contact 2 of relay R4 by conductor 278. Contact 1 of relay R4 is connected to contact 1 of switch S4 by conductor 279. Contact 3 of relay R4 is connected to contact 2 of switch S5 by conductor 281 and contact 4 of relay R4 is connected to one side of the motor M5 by conductor 282. The other side of motor M5 is connected to conductor 277 by conductor 283. One side of the winding of relay R4 is connected to conductor 277 by conductor 284 and the other side of the winding of relay R4 is connected to contact 1 of switch S2 by conductor 286. Contact 2 of switch S2 is connected to conductor 274 by conductor 287. Conductor 287 is connected to contact 2 of switch S8 by conductor 288.

Contact 1 of relay R3 is connected to one side of lamp L1 by conductor 289 and the other side of lamp L1 is connected to conductor 277 by conductor 291. Contact 2 of relay R3 is connected to contact 1 of switch S13 by conductor 292. Contact 2 of switch S13 is connected to one side of motor M3 by conductor 293 and the other side of motor M3 is connected to conductor 277 by conductor 294. Contact 3 of switch S13 is connected to one side of solenoid SO3 by conductor 296 and the other side of solenoid SO3 is connected to conductor 277 by conductor 297.

Contact 3 of relay R3 is connected to conductor 287 by conductor 298 and contact 4 of relay R3 is connected to contact 2 of switch S3 by conductor 299. Contact 1 of switch S3 is connected to one side of magnet 175 by conductor 301 and the other side of magnet 178 is connected to conductor 277 by conductor 302.

Contact 1 of relay R2 is connected to contact 3 of relay R1 by conductor 303 and contact 3 of relay R2 is connected to contact 1 of switch S8. Contact 4 of relay R2 is connected to contact 1 of relay R1 by conductor 305. Contact 5 of relay R2 is connected to contact 2 of switch S15 by conductor 306 and contact 1 of switch S15 is connected to contact 1 of switch S14 by conductor 307. Contact 2 of switch S14 is connected to one side of the winding of relay R3 by conductor 308 and the other side of the winding of relay R3 is connected to conductor 277 by conductor 309. One side of the winding of relay R2 is connected to conductor 304 by conductor 311 and the other side of the winding of relay R2 is connected to conductor 277 by conductor 312.

Contact 2 of relay 1 is connected to contact 3 of switch S8 by conductor 313. Contact 4 of relay R1 is connected to conductor 292 by conductor 314. Contact 5 of relay R1 is connected to conductor 287 by conductor 315. Contact 6 of relay R1 is connected to conductor 296 by conductor 316. One side of the winding of relay R1 is connected to conductor 303 by conductor 317 and the other side of the winding of relay R1 is connected to conductor 277 by conductor 318. One side of the motor M6 is connected to conductor 276 by conductor 319 and the other side of the motor M6 is connected to conductor 274 by conductor 321. Contact 1 of switch S16 is connected to conductor 287 by conductor 322. Contact 2 of switch S16 is connected to one side of solenoid valve SO4 by conductor 323 and the other side of solenoid valve SO4 is connected to conductor 302 by conductor 324. Conductor 322 is connected to contact 1 of switch S11 by conductor 325 and contact 2 of switch S11 is connected to contact 2 of relay R2 by conductor 326. Contact 1 of switch S1 is connected to one side of lamp L2 by conductor 327 and the other side of lamp L2 is connected to conductor 287 by conductor 328. Contact 2 of switch S12 is connected to conductor 302 by conductor 329.

One side of solenoid valve SO5 is connected to conductor 277 by conductor 331 and the other side of the solenoid operated valve is connected to the movable contact of toggle switch S17 by conductor 332. Terminal 1 of switch S17 is connected to conductor 325 by conductor 333 and terminal 2 of switch S17 is connected to one side of solenoid SO2 by conductor 334. The other side of solenoid SO2 is connected to conductor 331 by conductor 335. One side of solenoid SO1 is connected to conductor 331 by conductor 336 and the other side of solenoid SO1 is connected to contact 1 of switch S6 by conductor 337. One side of motor M1 is connected to conductor 331 by conductor 338 and the other side of motor M1 is connected to conductor 337 by conductor 339.

Contact 2 of switch S4 is connected to one of the wiping contacts of switch S9 by conductor 341. Contact 1 of switch S5 is connected to conductor 341 by conductor 342. Contact 2 of switch S6 is connected to the other of the wiping contacts of switch S9 by conductor 343. Contact 1 of switch S7 is connected to conductor 343 by conductor 344. Contact 2 of switch S7 is connected to conductor 334 by conductor 346.

Terminal 1 of switch S9 is connected to conductor 288 by conductor 347 and terminal 2 of switch S9 is connected to contact 1 of switch S1 by conductor 348. Contact 2 of switch S1 is connected to conductor 296 by conductor 349. Terminal 3 of switch S9 is connected to conductor 288 by conductor 351 and terminal 4 of switch S9 is connected to conductor 296 by conductor 352. One side of motor M2 is connected to conductor 352 by conductor 353 and the other side of motor M2 is connected to conductor 277 by conductor 354.

The wiping contact of bank 1 of switch S10 is connected to conductor 281 by conductor 356. Contact 1 of bank 1 of switch S10 is connected to conductor 282 by conductor 357 and contact 2 of bank 1 of switch S10 is connected to conductor 357 by conductor 358. The wiping contact of bank 2 of switch S10 is connected to conductor 279 by conductor 359. Contact 1 of bank 2 of switch S10 is connected to conductor 278 by conductor 361 and contact 3 of bank 2 of switch S10 is connected to conductor 361 by conductor 362.

The operation of our dispensing machine may now be described as follows: Let it be assumed that the canisters 32 have been filled with powdered commodities such as coffee, tea, cocoa and powdered soups. Let it also be assumed that the dispensing device 26 has been filled with powdered milk and that the dispensing device 237 has been filled with sugar and that the switches are in the positions shown in the circuit diagram. In operating the machine, the handle 33 is rotated until the selected commodity has been chosen. A sufficient amount of coin is then inserted through slot 173 which causes the following sequence of operation. First it should be pointed out that the coins will not be accepted unless the locking means 135 mounted on the rear side of the front door 18 has dropped into one of the indentations 140 in the outer periphery of the disc 34. When the locking means 135 drops into the indentation, switch S3 will be operated to close its contacts 1 and 2 to energize a coin acceptor circuit as hereinafter described.

As the proper amount of coin passes through the coin changer 172, the vending switch S11 will be operated to move its contacts 1 and 2 to a closed position. Closing of contacts 1 and 2 of switch S11 causes momentary energization of master relay R1. This circuit is completed from line LV1, through conductor 287, conductor 322, conductor 325, contacts 1 and 2 of vending switch S11, conductor 326, contacts 1 and 2 of relay R2, conductor 303, conductor 317, the winding of relay R1, conductor 318, conductor 277, to line LV2.

Energization of relay R1 closes its contacts 2 and 3 which energize the holding circuit for relay R1. This circuit is completed from line LV1 through conductor 287, conductor 288, contacts 2 and 3 of switch S8, conductor 313, contacts 2 and 3 of relay R1, conductor 317, the winding of relay R1, conductor 318, conductor 277, to line LV2.

At the same time that the master relay R1 is energized, its contacts 5 and 6 are closed which causes energization of the lock solenoid SO3, the cup dispensing motor M3 and the timer motor M2. The circuit for energizing the lock solenoid SO3 is completed from line LV1, through conductor 287, conductor 315, contacts 5 and 6 of relay R1, conductor 316, conductor 296, lock solenoid SO3, conductor 297, conductor 277, to line LV2. The circuit for energizing the cup dispensing motor M3 is completed from line LV1, through conductor 287, conductor 315, contacts 5 and 6 of relay R1, conductor 316, conductor 296, contacts 2 and 3 of switch S13, conductor 293, motor M3, conductor 294, conductor 277 to line LV2. The circuit for energizing the timer motor M2 is completed from line LV1, through conductor 287, conductor 315, contacts 5 and 6 of relay R1, conductor 316, conductor 296, conductor 352, conductor 353, motor M2, conductor 354, conductor 277 to line LV2.

The energization of lock solenoid SO3 serves to lock the L-shaped member 137 in position to prevent further rotation of the commodity wheel. The energization of motor M3 causes operation of the cup dispenser 181 in a manner well known to those skilled in the art. A single cup is dispensed and drops into the cup well 196 as hereinbefore described. Energization of the motor M2 causes operation of the timing assembly 152 and causes the following sequence of operation. The rotation of cams 163 and 164 by motor M2 causes operation of switches S4 and S5 and holds them in closed positions for a predetermined period of time. During the interval switches S4 and S5 are closed, motors M4 and M5 will be energized to dispense predetermined amounts of sugar and cream. The circuit for energizing motor M4 is completed from line LV1 through conductor 287, conductor 315, contacts 5 and 6 of relay R1, conductor 316, conductor 296, conductor 349, contacts 1 and 2 of switch S1, conductor 348, terminal 2 of switch S9, one of the wipers of switch S9, conductor 341, contacts 1 and 2 of switch S4, conductor 279, conductor 359, the wiper of bank 2 of switch S10, terminal 1 of bank 2 of switch S10, conductor 361, conductor 278, motor M4, conductor 277 to line LV2. The circuit for energizing the cream motor M5 is completed from line LV1, through conductor 287, conductor 315, contacts 5 and 6 of relay R1, conductor 316, conductor 296, conductor 349, contacts 1 and 2 of switch S1, conductor 348, terminal 2 of switch S9, one of the wipers of switch S9, conductor 341, conductor 342, contacts 1 and 2 of switch S5, conductor 356, the wiper of bank 1 of switch S10, terminal 1 of bank 1 of switch S10, conductor 357, conductor 282, motor M5, conductor 283, conductor 277, to line LV2.

It is apparent that by operation of switch S10 sugar or cream or both or neither can be selected. When switch S10 is on terminals 1 both cream and sugar will be dispensed. When switch S10 is on terminals 2, only cream will be dispensed and when switch S10 is on terminals 3 only sugar will be dispensed. When switch S10 is on terminals 4 neither cream nor sugar will be dispensed.

Movement of cam 166 of the timing assembly 152 causes operation of switch S6 to close its contacts for a predetermined interval of time. Operation of switch S6 causes energization of the drop motor M1 and the solenoid SO1. The circuit for the drop motor M1 is completed from line LV1, through conductor 287, conductor 315, contacts 5 and 6 of relay R1, conductor 316, conductor 296, conductor 352, terminal 4 of switch S9, one of the wipers of switch S9, conductor 343, contacts 1 and 2 of switch S6, conductor 337, conductor 339, motor M1, conductor 338, conductor 331, conductor 277, to line LV2. Solenoid SO1 will be energized at the same time because it is connected in parallel with the drop motor M1 by conductors 337 and 336. Energization of the solenoid SO1 will cause the gear motor assembly 102 to engage the selected canister. Energization of the motor M1 will cause rotation of the shaft 63 to dispense the desired quantity of material through the opening 69.

At approximately the same time, rotation of cam 167 causes operation of switch S7 to close its contacts for a predetermined period of time. Closing of the contacts of switch S7 causes energization of solenoid SO2 and SO5. The circuit for energization of solenoid SO2 is completed from line LV1 through conductor 287, conductor 315, contacts 5 and 6 of relay R1, conductor 316, conductor 296, conductor 352, terminal 4 of switch S9, one of the wipers of switch S9, conductor 343, conductor 344 contacts 1 and 2 of switch S7, conductor 346, conductor 334, solenoid SO2, conductor 335, conductor 331, conductor 277, to line LV1. Solenoid SO5 is energized at the same time as solenoid SO2 because it is connected in parallel with solenoid SO2 through conductor 334, switch S17, conductor 332, solenoid SO5, and conductor 331. Operation of the solenoid SO2 causes operation of the valve operating means 114 to allow the commodity to be dispensed into the cup held within the cup well 196. At the same time solenoid SO5 is operated to dispense the desired quantity of hot water into the cup.

After the desired commodities have been dispensed into the cup, switch S8 is operated by cam 168. Operation of switch S8 opens contacts 2 and 3 which de-energize the holding circuit for relay R1. Operation of switch S8 also closes its contacts 1 and 2 which energize relay R2. This circuit is completed from line LV1 through conductor 287, conductor 288, contacts 1 and 2 of switch S8, conductor 304, conductor 311, the winding of relay R2, conductor 312, conductor 277 to line LV2. Operation of relay R2 opens its contacts 1 and 2 which prevents energization of the master relay R1 in case the vending switch S11 should still be closed at the end of the cycle of the timing apparatus 152. Energization of rlay R2 closes its contacts 2 and 3 which serves to energize the holding circuit for relay R2 if the vending switch S11 should remain closed. This serves to prevent energization of the master relay R1 until the vending switch S11 is opened.

The de-energization of relay R1 also closes its contacts 4 and 5 which energize motor M3 to complete the cup drop cycle of the cup dispenser. The circuit is completed from line LV1 through conductor 287, conductor 315, contacts 4 and 5 or relay R1, conductor 314, conductor 292, contacts 1 and 2 of switch S13, conductor 293, motor M3, conductor 294, conductor 277, to line LV2.

Switch S9 is used for manually energizing switches S4, S5, S6 and S7 for testing the operation of the machine. Similarly switch S7 provides manual means for operating the solenoid valve SO5 to flush the cup well 196.

Switch S1 is a sugar and cream cut out switch and is adapted to be operated by cams 132 on the commodity wheel to prevent dispensing of sugar and cream on no sugar and cream drinks such as soups. It is apparent that when this switch is open, motors M4 and M5 cannot be energized.

Switch S2 is a sugar and cream by-pass switch and is also adapted to be operated by cams 132 on the commodity wheel. Its purpose is to by-pass the sugar and cream selector switch S10 when it is desired to dispense both sugar and cream in certain drinks such as cocoa and chocolate.

When switch S2 is operated its contacts 1 and 2 are moved into a closed position and serve to energize relay R4. This circuit is completed from line LV1, through conductor 287, contacts 1 and 2 of switch S2, conductor 286, the winding of relay R4, conductor 284, conductor 277 to line LV2. Energization of relay R4 causes closing of contacts 1 and 2 and 3 and 4. Closing of contacts 1 and 2 insures operation of the sugar motor M4 when the timing apparatus 152 goes through a cycle. The circuit is completed from line LV2, through coductor 287, conductor 315, contacts 5 and 6 of relay R1, conductor 316, conductor 296, conductor 349, contacts 1 and 2 of switch S1, conductor 348, terminal 2 of switch S9, one of the wipers of switch S9, conductor 341, contacts 1 and 2 of switch S4, conductor 279, contacts 1 and 2 of relay R4, conductor 278, motor M4, conductor 277 to line LV2. The circuit for motor M5 is completed in a similar manner through contacts 3 and 4 of relay R4.

Relay R3 is maintained in a normally energized position. This circuit is completed from line LV1 through conductor 287, conductor 288, contacts 2 and 3 of switch S8, conductor 313, contacts 1 and 2 of relay R1, conductor 305, contacts 4 and 5 of relay R2, conductor 306, switch S15, conductor 307, contacts 1 and 2 of switch S14, conductor 308, the winding of relay R3, conductor 309, conductor 277 to line LV2. It is apparent that this circuit is adapted to be opened and relay R3 de-energized by either of the switches S14 or S15. S14 is adapted to be opened when the cup dispenser is depleted of cups and switch S15 is adapted to be opened when the waste bucket 205 has been filled to a predetermined level.

When relay R3 is de-energized, its contacts 1 and 2 are closed to energize the sold out light L1. This circuit is completed from line LV1, through conductor 287, conductor 315, contacts 4 and 5 of relay R1, conductor 314, conductor 292, contacts 1 and 2 of relay R3, conductor 289, lamp L1, conductor 291, conductor 277 to line LV2. De-energization of relay R3 also opens its contacts 3 and 4 which open the coin acceptor circuit and prevents receipt of additional coins as hereinafter described.

As described above, switch S3 is in an open position until the lever 137 has dropped into one of the indentations 140 in the commodity wheel. Switch S3 is closed as soon as the lever 137 drops into the indentation and closes the coin acceptor circuit. This circuit is completed from line LV1 through conductor 287, conductor 298, contacts 3 and 4 of relay R3, conductor 299, contacts 1 and 2 of switch S3, conductor 301, magnet 175, conductor 302, conductor 277 to line LV2. When the magnet 175 is energized it permits receipt of coins by the dispensing machine. When it is de-energized it prevents the machine from accepting additional coins. Thus it is apparent that when neither switch S3 nor contacts 3 and 4 of relay R3 are open the machine will refuse to accept coins.

The tube switch S12 is operated when the coin change tube has fewer than a predetermined quantity of nickels and serves to light a light L2. This circuit is completed from line LV1, through conductor 287, conductor 320, lamp L2, conductor 327, contacts 1 and 2 of switch S12, conductor 329, conductor 302, conductor 377 to line LV2.

Switch S16 is adapted to be operated by the float and controls the energization of solenoid valve SO4 to control the water level in the reservoir 222.

After the timing apparatus 152 has completed its cycle as described above, the sliding door 202 may be raised and the filled cup lifted out of the machine. Thus, within a short interval of time a hot drink is prepared and ready to be consumed.

It is apparent from the foregoing that we have provided an improved dispensing machine of the automatic type which can be selectively operated to dispense any one of a plurality of hot drinks. The machine is provided with improved commodity canisters which are particularly easy to service, adjust and maintain.

We claim:

1. In a dispensing machine, a dispensing mechanism comprising a rotatable wheel member, a plurality of commodity canisters spaced circumferentially on said wheel member, said canisters having side walls and front and rear end walls, one of the side walls being formed with a dispensing opening and another of the side walls contiguous to said last named side wall being formed with a filling opening, each of said canisters including a shaft extending radially of the wheel member and mounted in the canister so that one end of the shaft protrudes from the canister adjacent the central portion of said wheel member, a measuring member mounted in the canister on said shaft and adapted to move a measured quantity of material over the dispensing opening in said canister, valve means mounted on the canister and movable between open and closed positions to permit discharge of the measured quantity, means mounted adjacent the central portion of said wheel member and adapted to engage the protruding end of the shaft of the selected canister for rotating the shaft through a predetermined arc, and means for moving the valve means of the selected canister to an open position and maintaining the valve means in an open position during rotation of the shaft of the selected canister.

2. In a dispensing machine, a dispensing mechanism comprising a framework, a commodity wheel rotatably mounted on said framework for selective operation, said commodity wheel comprising a vertical wheel member, a plurality of commodity canisters spaced circumferentially on said wheel member and adapted to carry a powdered commodity, said canisters being in the form of irregularly shaped polygons having at least four side walls and front and rear walls, each of said canisters including a shaft extending radially of the wheel member and rotatably mounted in the side walls of the canister, a measuring disc mounted within the canister and on said shaft, said measuring disc having a plurality of arcuate slots adapted to carry a measured quantity of powdered commodity over an opening in one of the side walls of the canister, valve means mounted on one of the side walls of the canister and movable between open and closed positions with respect to said opening, a filling opening in another of the side walls of the canister, means mounted on said framework for engaging one end of the shaft of the selected canister for rotating the measuring disc through a predetermined arc, and means mounted on said framework for moving the valve means of the selected canister to an open position and holding the valve means in an open position during rotation of said measuring disc.

3. A dispensing mechanism as in claim 2 wherein the commodity canisters are mounted on the wheel member side by side to substantially utilize the area on one side of the commodity wheel and in such a manner that one of the side walls of each canister is adjacent and parallel to a side wall of an adjacent canister and another side wall of each canister is adjacent and parallel to a side wall of another adjacent canister.

4. A dispensing mechanism as in claim 2 wherein the valve means and the filling means are mounted on adjacent side walls of the canister, said adjacent side walls facing towards the outer margin of the wheel member.

5. A dispensing mechanism as in claim 4 together with means mounted on the wheel member to permit rotation of the wheel member in only one direction and wherein in each canister the side wall leading to the side wall on which the valve means is mounted forms an angle of substantially 90° with respect to the side wall on which the valve means is mounted.

6. A dispensing mechanism as in claim 2 in which baffles are mounted on one wall of at least one of the canisters to move the powdered commodity towards the measuring disc as the commodity wheel is rotated.

7. A dispensing mechanism as in claim 2 wherein said means for engaging and rotating the shaft of the selected canister consists of a bridge-like member mounted on said framework and extending diametrically across and over said commodity wheel, a hinged member having one end pivotally connected to said bridge-like member, drive means mounted on the free end of said hinged member and adapted to engage and rotate the shaft of the selected canister, said drive means and said hinged member being movable between a shaft engaging position and an out-of-the-way position, and means connected to said hinged member for moving said drive means and said hinged member between said positions.

8. A dispensing mechanism as in claim 2 wherein said valve means includes an operating member pivotally mounted on the canister and wherein said means for moving the valve means of the selected canister between open and closed positions consists of a fixed member mounted on said framework and generally underlying said commodity wheel, an arm having one end pivotally connected to said fixed member, the free end of said arm being adapted to engage said operating member to move said valve means to an open position, said arm being movable between a valve open position and an out-of-the-way position, and means mounted on said fixed member and connected to said arm for moving said arm between said two positions.

9. In a dispensing machine a dispensing mechanism comprising, a framework, a commodity wheel rotatably mounted on said framework for selective operation, said commodity wheel comprising a wheel member, a plurality of canisters spaced circumferentially on said wheel member and adapted to carry a powdered material, said canisters having side walls and front and rear walls, one of the side walls being formed with a dispensing opening and another of the side walls contiguous to said last named side wall being formed with a filling opening, each of said commodity canisters including a shaft rotatably mounted in the canister, one end of the shaft protruding from the canister and having driven means fixed thereto, a measuring disc mounted in the canister and on said shaft, said measuring disc having a plurality of arcuate slots adapted to carry a measured quantity of powdered material over the dispensing opening in the canister, valve means including an operating member mounted on the exterior of the canister and movable between open and closed positions with respect to said dispensing opening, means mounted on said framework and adapted to engage the protruding end of the selected canister for rotating the shaft through a predetermined arc, said means including a hinged member having one end pivotally mounted on said framework and extending in a plane substantially perpendicular to the plane of the commodity wheel, a gear motor mounted on the free end of said hinged member and having an output shaft depending at right angles from said hinged member, drive means mounted on said output shaft adapted to engage the driven means on the shaft of the selected canister, and means for moving said hinged member about its pivoted end to bring the drive means into engagement with the driven means on the selected shaft, and means mounted on said framework below said commodity wheel for moving the valve of the selected canister to an open position and to maintain the valve in an open position during rotation of the shaft of the selected canister, said last named means including an arm pivotally mounted on said framework and adapted to engage the operating member of the valve means, said arm being movable between a valve open position and an out-of-the-way position, and means mounted on said framework for moving said arm between said two positions.

10. A mechanism as in claim 9 wherein said canister includes a member mounted within said canister adjacent the measuring disc on the side of the measuring disc opposite the opening, and adjustment means mounted in said canister and on said member for varying the spacing between the member and the dispensing wheel, said adjustment means being accessible through the opening in the canister.

11. A mechanism as in claim 10 wherein each of said canisters includes a transparent wall and means for detachably mounting said wall on the canister, said last named means being a resilient ring engaging the side edges of the transparent wall and the side edges of the canister.

12. A mechanism as in claim 9 wherein the valve means of the canister is operated in the six o'clock position of the canister and wherein each of the canisters is provided with a filling opening which is in an upright position in the eleven o'clock position of the canister.

13. In a dispensing machine a dispensing mechanism comprising, a vertically disposed rotatable wheel member, a plurality of commodity canisters spaced circumferentially on said wheel member, each of said canisters including a shaft extending radially of the wheel member and mounted in the canister so that one end of the shaft protrudes from the canister, a measuring member mounted in the canister on said shaft and adapted to move a measured quantity of material over an opening in said canister, valve means mounted on said canister and movable between open and closed positions to permit discharge of the measured quantity, means adapted to engage the protruding ends of the shaft of the selected canister for rotating the shaft through a predetermined arc, and means for moving the valve means of the selected canister to an open position and maintaining the valve means in an open position during rotation of the shaft of the selected canister while the canister is in a six o'clock position, each of said canisters being provided with a filling opening which is in a filling position when the canister is in an eleven o'clock position.

14. In a dispensing machine a dispensing mechanism comprising, a rotatable wheel member, a plurality of commodity canisters spaced circumferentially on said wheel member, each of said canisters including a shaft extending radially of the wheel member and mounted in the canister so that one end of the canister shaft protrudes from the canister adjacent the central portion of said wheel member, a measuring member mounted in the canister on said shaft and adapted to move a measured quantity of material over a dispensing opening in said canister, valve means mounted on the canister and movable between open and closed positions to permit discharge of the measured quantity, means mounted adjacent the central portion of said wheel member and adapted to engage the protruding end of the shaft of the selected canister for rotating the shaft through a predetermined arc, means for moving the valve means of the selected canister to an open position and maintaining the valve means in an open position during rotation of the shaft of the selected canister, and adjustment means mounted within the canister for varying the quantity of material moved over the dispensing opening in the canister, said adjustment means being accessible for adjustment through the dispensing opening in the canister.

15. In a dispensing machine a dispensing mechanism comprising, a rotatable wheel member mounted for rotation about a horizontal axis, and a plurality of commodity canisters spaced circumferentially on said wheel member and fixed thereto to prevent rotation thereof with respect to said wheel member, said canisters having substantially flat side walls and front and rear end walls forming irregularly-shaped polygons, at least two of said side walls being contiguous and facing towards the outer margin of the wheel member, one of said two side walls being formed with a dispensing opening therein which is in a substantially horizontal plane when said canister is in a six o'clock position with respect to said horizontal axis, the other of said two side walls being formed with a filling opening therein which is in a substantially horizontal plane when said canister is in an eleven o'clock position with respect to said horizontal axis.

16. In a dispensing machine a dispensing mechanism comprising, a rotatable wheel member mounted for rotation about a horizontal axis, and a plurality of commodity canisters spaced circumferentially on said wheel member and fixed thereto to prevent rotation with respect to said wheel member, said canisters having substantially flat side walls and front and rear walls forming irregularly-shaped polygons, at least two of said side walls facing towards the outer margin of the wheel member, one of said two side walls being formed with a dispensing opening therein and the other of said two side walls being formed with a filling opening therein, and an inclined baffle mounted on one of the end walls and inclined towards the dispensing opening so that the commodity in the container is moved towards the dispensing opening as the member is rotated.

17. In a dispensing machine a dispensing mechanism comprising, a rotatable wheel member mounted for rotation about a horizontal axis, a plurality of detachable commodity canisters spaced circumferentially on said wheel member and fixed thereto to prevent rotation thereof with respect to said wheel member, each of said canisters having valve means, a filling opening lying in a horizontal plane and in a filling position when the canister is in a substantially eleven o'clock position with respect to said horizontal axis, means for operating the valve means of each of the canisters when the canister is in a six o'clock position with respect to said horizontal axis, the exterior and the interior of the said canisters being in the form of irregularly shaped polygons having at least four side walls and front and rear end walls, the valve means being mounted on one side wall and the filling opening being disposed in another side wall, the commodity canisters being mounted side by side in such a manner that one of the side walls of each of the canisters is adjacent and parallel to one of the side walls of the adjacent canister on one side and another side wall of each of the canisters is adjacent and parallel to one side of the side walls of the adjacent canister on the other side.

18. A dispensing mechanism as in claim 17 wherein the side wall in which the valve means is mounted and the side wall in which the filling opening is disposed are contiguous and face towards the outer margin of the wheel member.

19. In a dispensing machine a dispensing mechanism comprising, a rotatable wheel member mounted for rotation about a horizontal axis, a plurality of detachable commodity canisters spaced circumferentially on said wheel member and fixed thereto to prevent rotation thereof with respect to said wheel member, each of said canisters having valve means, a filling opening lying in a horizontal plane in a filling position when the canister is in a substantially eleven o'clock position with respect to said horizontal axis, means for operating the valve means of each of the canisters when the canister is in a six o'clock position with respect to said horizontal axis, and a baffle mounted inside of at least one of the canisters and one of the end walls of the canister and inclined towards the valve means to move the commodity therein towards the valve means as the wheel member is rotated.

References Cited in the file of this patent

UNITED STATES PATENTS

| | | |
|---|---|---|
| 180,945 | Shepard | Aug. 8, 1876 |
| 245,270 | Barker | Aug. 9, 1881 |
| 279,135 | Cornford | June 12, 1883 |
| 301,598 | Hunt | July 8, 1884 |
| 465,212 | Schilling | Dec. 15, 1891 |
| 792,620 | Ryan | June 20, 1905 |
| 823,677 | Fonbonne | June 19, 1906 |
| 888,464 | Burri et al. | May 26, 1908 |
| 1,084,636 | Hunerkopf | Jan. 20, 1914 |
| 1,226,278 | Teves | May 15, 1917 |
| 1,388,632 | Dean | Aug. 23, 1921 |
| 1,529,379 | Thompson | Mar. 10, 1925 |
| 1,914,980 | Reiter | June 20, 1933 |
| 2,094,702 | Hexter | Oct. 5, 1937 |
| 2,158,795 | Grubelic | May 16, 1939 |
| 2,660,351 | Thompson | Nov. 24, 1953 |
| 2,684,782 | Lime et al. | July 27, 1954 |
| 2,742,194 | Brown | Apr. 17, 1956 |
| 2,787,402 | Stiner et al. | Apr. 2, 1957 |
| 2,848,019 | Corbin et al. | Aug. 19, 1958 |